United States Patent [19]

Amemiya et al.

[11] Patent Number: 5,206,062
[45] Date of Patent: Apr. 27, 1993

[54] VESSEL FOR AEROSOL

[75] Inventors: Hideo Amemiya, Yokohama; Minoru Kuroda, Urawa; Tsutomu Shike; Mikio Minagawa, both of Gotenba, all of Japan

[73] Assignees: Mitsui Toatsu Chemicals, Inc., Tokyo; Kabushiki Gaisha Tokai, Kanagawa, both of Japan

[21] Appl. No.: 887,582

[22] Filed: May 20, 1992

Related U.S. Application Data

[63] Continuation of Ser. No. 523,534, May 15, 1990, abandoned.

[30] Foreign Application Priority Data

May 23, 1989 [JP] Japan .................. 1-127760

[51] Int. Cl.$^5$ .................. B65B 5/40; B65D 1/00; C08L 51/04
[52] U.S. Cl. .................. 428/36.92; 428/35.7; 428/36.6; 428/36.8; 525/316
[58] Field of Search .................. 428/35.7, 36.6, 36.8, 428/36.9, 36.92

[56] References Cited

U.S. PATENT DOCUMENTS 3,914,337 10/1975 Giddings et al. .................. 525/84
3,934,743 1/1976 McChesney .................. 428/910
3,963,807 5/1976 Howe .................. 525/316

FOREIGN PATENT DOCUMENTS 1260082 1/1972 United Kingdom .
1508094 4/1978 United Kingdom .

OTHER PUBLICATIONS

WPIL, File Supplier, AN=90-158626, Derwent Publications Ltd., London, GB; & JP-A-01 240 468 (Mitsui Toatsu), Sep. 26, 1989.
WPIL, File Supplier, AN=89-029189, Derwent Publications Ltd., London, GB; & JP-A-63 304 015 (Mitsui Toatsu) Dec. 12, 1988.
WPIL, File Supplier, AN=90-315540, Derwent Publications Ltd., London, GB; & JP-A-02 222 741 (Mitsui Toatsu) Sep. 5, 1990.
WPIL, File Supplier, AN=87-296045, Derwent Publications Ltd., London, GB; & JP-A-62 208 379 (Mitsui Toatsu) Sep. 12, 1987.

Primary Examiner—Ellis P. Robinson
Assistant Examiner—Rena L. Dye
Attorney, Agent, or Firm—Burns, Doane, Swecker & Mathis

[57] ABSTRACT

A vessel for aerosol is manufactured by a high-nitryl resin which is formed by graft polymerizing a mixture of monomers of a 60 to 90 weight part comprising an unsaturated nitryl compound of at least 60 weight % and an aromatic vinyl compound of at least 5 weight % to diene synthetic rubber of a 1 to 40 weight part containing a conjugated diene monomer of 50 weight % or more, wherein assuming that a content of the unsaturated nitryl compound in the resin grafted to the rubber is set to X weight % in the high-nitryl resin and a content of the unsaturated nitryl compound in the matrix resin is set to Y weight %, the vessel is manufactured by the resin which satisfies the relation of $$60 < X < Y < 90$$

between X and Y.

4 Claims, 1 Drawing Sheet

VESSEL FOR AEROSOL

This application is a continuation of Application Ser. No. 07/523,534, filed May 15, 1990 is now abandoned.

TECHNICAL FIELD

The present invention relates to a vessel for aerosol made of a high-nitrile resin and, more particularly, to a vessel for aerosol made of a high-nitrile resin which is excellent in heat resistance, water resistance, and environmental stress crack resistance.

BACKGROUND OF THE INVENTION

Hitherto, vessels for aerosol of hair spray, insecticide, and the like are mainly made of metal such as tin, aluminum, or the like.

In recent years, the vessels for aerosol made of plastics have been put into practical use. Polyester, high-nitrile resin, or the like is used for such a container.

Particularly, the high-nitrile resin is suitable because it is excellent in gas barrier property and chemical resistance, and its practical use is progressing.

However, since the high-nitrile resin has a hygroscopicity, if a content contains the water, the vessel itself absorbs the moisture and a softening temperature decreases, so that there is a problem such that the vessel is deformed due to an increase in inner pressure at high temperatures of 50° to 70 °C.

On the other hand, in the case of vessels made of a resin, not only the cylindrical vessels such as a conventional vessel made of metal but also heteromorphic vessels having a cross section of an ellipse, a rectangle, or the like can be obtained. However, at high temperatures of 50° to 70° C., there is a problem such that what is called environmental stress cracks occur depending on the vessel shape, that is, the inner pressure increases at such high temperatures, stresses are concentrated to a part of the container, chemicals of the content touch this portion, and cracks are caused.

DISCLOSURE OF THE INVENTION

It is an object of the present invention to solve the foregoing problems and to provide a vessel for aerosol made of plastics which is excellent in heat resistance, water resistance, and environmental stress crack resistance.

The present inventors have studied and examined in order to obtain a vessel for aerosol which can satisfy the above object, so that they have found out that by using a special high-nitrile resin, it is possible to obtain a vessel for aerosol which is excellent in heat resistance, water resistance, and environmental stress crack resistance, and they reached the present invention.

That is, the invention provides a vessel for aerosol whose body is made of a high-nitrile resin, wherein the high-nitrile resin is a polymer in which a mixture of monomers of 60 to 90 weight part comprising an unsaturated nitrile compound of at least 60 weight % and an aromatic vinyl compound of at least 5 weight % is graft polymerized to diene synthetic rubbers of 1 to 40 weight part containing a conjugated diene monomer of 50 weight % or more, and in the polymer, assuming that a content of the unsaturated nitrile compound in the resin which was grafted to the rubbers is set to X weight % and a content of the unsaturated nitrile compound in the matrix resin is set to Y weight %, there is a relation of $$60 < X < Y 90$$

between X and Y.

The conjugated diene synthetic rubber which is used in the invention is a copolymer of a conjugated diene monomer of 50 weight % or more and at least one kind of monomer selected from an unsaturated nitrile compound copolymerizable with it, an aromatic vinyl compound, an unsaturated carboxylic ester, and the like. As a conjugated diene monomer, there are shown 1,3-butadiene, isoprene, chloroprene, 2,3-dimethyl-1,3-butadiene, 2,3-diethyl-1,3-butadiene, and the like as examples.

As an unsaturated nitrile compound, there can be mentioned acrylonitrile, methacrylonitrile, α-chloroacrylonitrile, and the like, preferably, acrylonitrile and methacrylonitrile.

On the other hand, as an aromatic vinyl compound, there can be mentioned styrene, α-methylstyrene, vinyltoluene, vinylxylenes, and the like. Styrene and α-methylstyrene are preferable.

As an unsaturated carboxylic ester, there can be mentioned esters of methyl, ethyl, propyl, or butyl acrylate or methacrylate or the like. Particularly, methyl acrylate, ethyl acrylate, methyl methacrylate, and ethyl methacrylate are preferable.

As a monomer grafted to conjugated diene synthetic rubbers, in addition to the unsaturated nitryl compound and aromatic vinyl compound, there can be mentioned a vinyl compound having the copolymerization therewith, for instance, monomers of the foregoing unsaturated carboxylic ester, vinyl ester, vinyl ether, α-olefin, and the like. However, unsaturated carboxylic ester is suitable from a viewpoint of the balance between the shock resistance and the flowability upon molding work.

The high-nitrile resin of the present invention is not practically preferable because the resin part excluding the rubber compound needs to contain an unsaturated nitrile compound of at least 60 weight % or more and, in the case where the content of unsaturated nitrile compound is less than 60 weight %, the inherent characteristics such as chemical resistance, gas tightness, and the like of the nitrile resin are lost. On the other hand, when the content of unsaturated nitrile compound exceeds 90 weight %, there are problems such as deterioration in flowability upon molding work, shock resistance, and the like and yellowing of the resin upon molding.

Explaining in more detail, assuming that the contents of the unsaturated nitrile compound in the resin part grafted to rubber and in the matrix part are set to X and Y weight %, respectively, it is necessary to set X and Y to values within a range from 60 to 90 weight %. At the same time, it is necessary to satisfy the relation of $X \leq Y$ between X and Y, that is, it is necessary that the content of the unsaturated nitrile compound in the matrix resin is at least equal to or larger than the content of the unsaturated nitrile compound in the grafted resin.

The aromatic vinyl compound needs to be set to at least 5 weight %. It is practically preferable to set to 10 weight % or more to improve the heat resistance and water resistance.

An amount of other vinyl compound which can be used without losing the object of the invention is set to a value of up to 25 weight & in the mixture of monomers. The mixture of monomers which is used in the specification substantially denotes only a vinyl monomer and does not contain what is called a diluent or the like. However, a diluent or the like may be also used in manufacturing.

A content of rubbers in all of the resins is set to a value of 1 to 40 weight part. However, a range of 5 to 30 weight parts is desirable from a viewpoint of the balance between the shock resistance and the flowability upon molding work.

The resin of the invention is obtained by polymerizing a mixture of monomers containing the unsaturated nitrile compound and aromatic vinyl compound under the existence of conjugated diene synthetic rubbers. As a polymerizing method, there can be used well-known solution polymerization, bulk polymerization, emulsion polymerization, suspension polymerization, a polymerizing method of an arbitrary combination of them, and the like. From an industrial viewpoint, the emulsion polymerization is preferable because of the easiness in elimination of the heat of reaction and in execution of the post-process of the polymerization.

The high-nitrile resin which is used in the invention can also contain a plasticizer, a stabilizer, a lubricant, a dye, a pigment, a filler, and the like, and a small amount of other resin.

The vessel for aerosol of the invention is manufactured by using a high-nitrile resin of special compositions as mentioned above. As its manufacturing method, for instance, a vessel body is molded by a method such as injected molding, injection-blow molding, extrusion-blow molding, injection-stretch-blow molding, extrusion-stretch blow molding, or the like and a cap portion to which parts such as an Spray nozzle and the like are assembled is airtightly integrated with the vessel body, thereby obtaining a container. Any one of the above manufacturing methods ca be used.

As a method whereby a cap portion to which parts such as an Spray nozzle and the like are assembled is airtightly integrated with the vessel body, there are a method whereby the cap portion is molded by a resin which can be melted and bonded to the vessel body are melted and bonded by a method such as ultrasonic melt-bonding, high frequency melt-bonding, spin welding, or the like, a method whereby a metallic cap portion is wound and fastened around the vessel body, and the like. However, any method can be used if the practical airtightness is obtained.

The container according to the invention is advantageous as a vessel for aerosol for storing a solution containing a solvent such as water, ethanol, or the like for cosmetics, toiletry supplies, medicines, automobile supplies, industrial supplies, insecticide, germicide, antiphlogistic, hair conditioners, cleaner, and the like.

Further, the above container is also suitable to store acid and alkaline solutions which cannot be used hitherto in a metal can. The above vessel can be used to store a liquid of a PH value in a range of 2 to 13.

BRIEF DESCRIPTION OF THE DRAWINGS

The drawing is a diagram of a cross sectional view showing an embodiment of a vessel for aerosol according to the present invention.

PREFERRED EMBODIMENTS OF THE INVENTION

Figure 1:
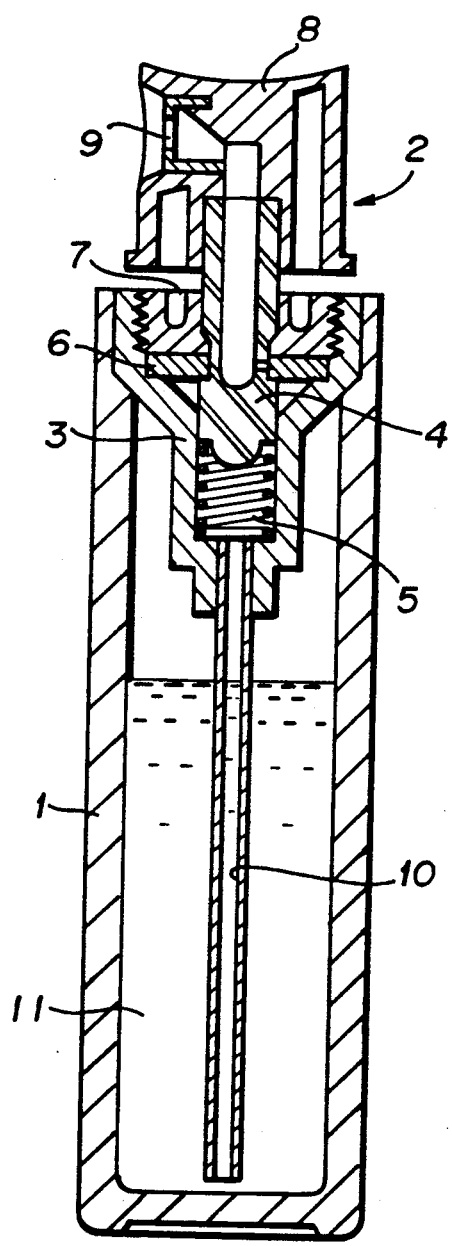

In FIG. 1, reference numeral 1 denotes a container and 2 indicates an spray valve assembly. The spray valve assembly 2 comprises; a housing 3; a valve 4; a spring 5; a packing 6; a sealing member 7; a push button 8; a nozzle 9; and a tube 10.

Since the operations of those parts are well known, their descriptions are omitted here. However, in the invention, parts which are manufactured by using a high-nitrile resin include not only the vessel 1 but also the housing 3 and valve 4.

The invention will be described hereinbelow with respect to embodiments.

Embodiment 1

A high-nitrile resin was obtained by polymerizing a mixture comprising acrylonitrile of a 75 weight part and styrene of a 25 weight part under the existence of a butadiene-acrylonitrile rubber-like copolymer (butadiene of a 62 weight %) of a 10 weight part.

The resin was dissolved into a mixture solvent in which dimeth; ylformamide and acetonitrile were mixed at a ratio of 1:1. The resin was then separated into a grafted portion which is insoluble to the solvent and a matrix portion which is soluble to the solvent. Compositions of monomers in the respective resins were examined. Thus, the grafted resin had the compositions of acrylonitrile of 65 weight % and styrene of 35 weight %. On the other hand, the matrix resin had the compositions of actylonitrile of 73 weight % and styrene of 27 weight %.

A vessel body was obtained by using the above high-nitrile resin by injection molding it by an injection molding apparatus FS80S12ASE made by Nissei Plastic Industrial Co., Ltd..

The vessel obtained had a shape such that a cross section of a central portion of the container had a rectangular shape whose width was set to about 3.5 cm and whose thickness was set to about 3 cm and that a height was set to about 10 cm, a thickness of resin was set to about 2.3 mm, and a volume was set to about 75 cc.

A cap member was obtained by injection molding the same high-nitrile resin to which injection apparatus parts had been assembled. Such a cap member was melted and bonded to the vessel body by an Ultrasonic melt-bonding method and was sealed. After that, the pressure resistant strength by the water pressure was examined.

The pressure resistant strengths were examined with respect to ten containers. Thus, in all of them, an abnormality such as occurrence of cracks or the like was not found out even when a pressure of 40 kg/cm$^2$ was applied.

On the other hand, the water was poured into the vessel body and the inner pressure was set to 3.5 kg/cm$^2$ at a room temperature of freon 11 and freon 12. A cap member was Obtained by injection molding the same high-nitrile resin to which injection apparatus parts had been assmebled. Such a cap member was melted and bonded to the vessel body by the ultrasonic melt-bonding method and sealed.

Ten vessels were prepared as mentioned above and left at a room temperature for one week. After that, the ten containers were left at 60° C. for 24 hours. However, the generation of cracks was not found out.

Embodiment 2

Under the existence of a butadiene-acrylonitrile rubber-like copolymer (butadiene of 70 weight %) of a 10 weight part, a high-nitrile resin was obtained by polymerizing a mixture comprising acrylonitrile of a 75 weight part, styrene of a 15 weight part, and methyl methacrylate of a 10 weight part.

Such a resin was dissolved to a mixture solvent in which dimethylformamide and acetonitrile were mixed at a ratio of 1 : 1. Then resin was then separated into a grafted portion which is insoluble to the solvent and a matrix portion which is soluble to the solvent. The monomer compositions in the respective resins were examined. Thus, the grafted resin had the compositions of acrylonitrile of 72 weight %, styrene of 18 weight %, and methyl methacrylate of 10 weight %. The matrix resin had the compositions of acrylonitrile of 74 weight %, styrene of 14 weight %, and methyl methacrylate of 12 weight %.

The water pressure tests and the tests for the water and ethanol were executed in a manner similar to the embodiment 1 except that the above resin was used. Thus, no abnormality was found out in any of the above cases.

Comparison 1

Under the existence of a butadiene-acrylonitrile rubber-like copolymer (butadiene of 68 weight %) of a 10 weight part, a high-nitrile resin was obtained by polymerizing a mixture comprising acrylonitrile of a 55weight part, styrene of a 35 weight part and methyl methacrylate of a 10 weight part.

The above resin was dissolved to a mixture solvent in which dimethylformamide and acetonitrile were mixed at a ratio of 1 : 1. The resin was then separated to a grafted portion which is insoluble to the solvent and a matrix portion which is soluble to the solvent. The monomer compositions in the respective resins were examined. Thus, the grafted resin had the compositions of acrylonitrile of 45 weight %, styrene of 47 weight %, and methyl methacrylate of 8 weight %. The matrix resin had the compositions of acrylonitrile of 52 weight %, styrene of 38 weight %, and methyl methacrylate of 10 weight %.

The water pressure tests and the tests for the water and ethanol were executed in a manner similar to the embodiment 1 except that the above resin was used.

In the water pressure tests, no abnormality was found out. However, in all of the vessels filled with the water, the central portions of the vessels were apparently clearly expanded. When the dimensions were actually measured in the direction of thickness of the central portions of the containers, the dimensions were increased by about 4 mm. On the other hand, in the case of the vessels filled with ethanol, the generation of cracks was found out in the corner portions of four vessels among the ten containers.

Comparison 2

Under the existence of a butadiene-acrylonitrile rubber like copolymer (butadiene of 62 weight %) of a 10 weight part, a high-nitrile resin was obtained by polymerizing a mixture comprising acrylonitrile of a 95 weight part and styrene of a 5 weight part.

The above resin was dissolved to a mixture solvent in which dimethylformamide and acetonitrile were mixed at a ratio of 1 : 1. The resin was then separated to a grafted portion which is insoluble to the solvent. The monomer compositions in the respective resins were examined. Thus, the grafted resin had the compositions of acrylonitrile of 90 weight % and styrene of 10 weight %. The matrix resin had the compositions of acrylonitrile of 95 weight % and styrene of 5 weight %.

A vessel body was obtained by injection molding by using the above resin in a manner similar to the embodiment 1. However, the yellowing was remarkable.

The water pressure tests and the tests in the case where the water and ethanol were filled in the vessels were executed by using the above vessels in a manner similar to the embodiment 1.

In the water pressure tests, cracks were generated at pressures of 15 to 20 kg/cm$^2$ in all of the containers and the withstanding pressure strengths were low.

On the other hand, in the case of the vessels filled with the water, no external appearance change was found out. However, in the containers filled with ethanol, the generation of cracks was found out in all of the ten vessels.

Embodiment 3

Under the existence of a butadiene-acrylonitrile rubber-like copolymer butadiene of 70 weight % of a 10 weight part, a high-nitrile resin was obtained by polymerizing monomer compositions of a 100 weight part comprising acrylonitrile of a 70 weight part, methyl acrylate of a 10 weight part, and styrene of a 20 weight part.

The resin was dissolved to a mixture solvent in which dimethylformamide and acetonitrile were mixed at a ratio of 1 : 1. The resin was then separated to a grafted portion which is insoluble to the solvent and a matrix portion which is soluble to the solvent. The monomer compositions in the respective resins were examined. Thus, the grafted resin had the compositions of acrylonitrile of 64 weight %, methyl acrylate of 9 weight %, and styrene of 27 weight %. The matrix resin had the compositions of acrylonitrile of 69 weight %, methyl acrylate of 11 weight %, and styrene of 20 weight %.

A vessel body was obtained by injection molding the above high-nitrile resin by using the injection molding apparatus FS80S12ASE made by Nissei Plastic Industrial Co., Ltd.

The container obtained had a shape such that a cross section of the central portion of the vessel has a rectangular shape whose width was set to about 3.5 cm and whose thickness was set to about 3 cm and that a height was set to about 10 cm, a thickness of resin was set to about 2.3 mm, and a volume was set to about 75 cc.

On the other hand, parts were manufactured by the injection molding by using the same high-nitrile resin as that mentioned above and a valve was assembled.

A sulfate aqueous solution which was adjusted to PH 4 was poured into the vessel body and the inner pressure was set to 5.5 kg/cm$^2$ by mixture gases of freon 11 and freon 12. A housing to which injection apparatus parts had been assembled was melted and bonded to the container body by an ultrasonic melt-bonding method and was sealed.

Ten vessels were prepared as mentioned above and left at a room temperature for six months. Thus, in all of the ten containers, a reduction in inner pressure and an external abnormality were not found out. On the other hand, ten vessels which were separately adjusted were repetitively dropped ten times onto the floor of the plastic tiles from a position of a height of 1.2 m at a room temperature. However, no damage was found out in all of the ten vessels.

The ten vessels were left at 60 °C. for 25 hours in a manner similar to the embodiment 1. However, abnormalities such as deformation, generation of cracks, and the like were not found out.

Embodiment 4

Under the existence of a butadiene-acrylonitrile rubber-like copolymer butadiene of 70 weight % of an 8 weight part, a high-nitrile resin was obtained by polymerizing monomer compounds of a 100 weight part comprising acrylonitrile of an 80 weight part, methyl acrylate of a 5 weight part, and styrene of a 15 weight part.

The above resin was dissolved to a mixture solvent in which dimethylformamide and acetonitrile were mixed at a ratio of 1 : 1. The resin was then separated to a grafted portion which is insoluble to the solvent and a matrix portion which is soluble to the solvent. The monomer compositions in the respective resins were examined. Thus, the grafted resin had the compositions of acrylonitrile of 76 weight %, methyl acrylate of 6 weight %, and styrene of 18 weight %. The matrix resin had the compositions of acrylonitrile of 78 weight %, methyl acrylate of 5 weight &, and styrene of 17 weight %.

A vessel was formed in a manner similar to the embodiment 3 except that the above high-nitrile resin was used and a sodium hydroxide aqueous solution which had been adjusted to PH 10 was used. A content was filled in the container, the vessel was sealed, and the tests similar to those in the embodiment 3 were executed.

As results of the tests, a decrease in inner pressure, an external abnormality, and a damage were not found out.

Embodiment 5

A depilatory of PH 12.6 was poured into the same vessels as the those used in the embodiments 3 and 4 and the tests similar to those in the embodiment 3 were executed.

As results of the tests, a decrease in inner pressure and other external abnormality were not found out.

Embodiment 6

A water repellent agent of PH 2.5 was poured into the same vessels as those used in the embodiments 3 and 4 and the tests similar to those in the embodiment 3 were executed.

As results of the tests, a decrease in inner pressure and other external abnormality were not found out.

Industrial Applicability

Aerosol vessels of the present invention can be suitably used as vessels for aerosol for cosmetics, toiletry supplies, insecticide, or the like containing the water, ethanol, or acid or alkaline organic chemicals.

We claim:

1. A vessel for aerosol comprising a high-nitrile resin blend, said vessel capable of storing ethyl alcohol, wherein said high-nitrile resin blend comprises a polymer having from 60 to 90 weight parts of a mixture of monomers comprising at least 60 weight % of an unsaturated nitrile compound and at least above 5 weight % of an aromatic vinyl compound which has been graft polymerized to 1 to 40 weight parts of diene synthetic rubbers containing 50 weight % or more of a conjugated diene monomer, wherein said high-nitrile resin comprises a grafted resin blend and a non-grafted resin wherein the content of unsaturated nitrile compound in resin grafted to the diene synthetic rubbers in the polymer is represented by X weight % and the content of unsaturated nitrile compound in the non-grafted resin is represented by Y weight %, the vessel for aerosol comprising a high-nitrile resin blend which satisfies a relation of $$[60]63 < X \leq Y < [90]75$$

between X and Y.

2. The vessel of claim 1, wherein x=65 and y=73.
3. The vessel of claim 1, wherein x=72 and y=74.
4. The vessel of claim 1, wherein x=64 and y=69.

* * * * *

UNITED STATES PATENT AND TRADEMARK OFFICE
CERTIFICATE OF CORRECTION

PATENT NO. : 5,206,062

DATED : April 27, 1993

INVENTOR(S) : Amemiya et al.

It is certified that error appears in the above-identified patent and that said Letters Patent is hereby corrected as shown below:

Column 8, line 25, after "resin" insert --blend--; and line 26, after "resin" delete "blend".

Signed and Sealed this

Third Day of May, 1994

*Attest:*

BRUCE LEHMAN

*Attesting Officer*     *Commissioner of Patents and Trademarks*